(12) United States Patent
Frontiero et al.

(10) Patent No.: US 10,990,503 B2
(45) Date of Patent: *Apr. 27, 2021

(54) AUTOMATED SOFTWARE CODE REVIEW

(71) Applicant: International Business Machines Corporation, Armonk, NY (US)

(72) Inventors: William H. Frontiero, Gloucester, MA (US); Spencer T. Murata, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/775,268

(22) Filed: Jan. 28, 2020

(65) Prior Publication Data
US 2020/0167262 A1 May 28, 2020

Related U.S. Application Data

(63) Continuation of application No. 15/093,013, filed on Apr. 7, 2016, now Pat. No. 10,585,776.

(51) Int. Cl.
*G06F 11/36* (2006.01)
*G06F 11/30* (2006.01)
*G06F 21/57* (2013.01)

(52) U.S. Cl.
CPC ............ *G06F 11/36* (2013.01); *G06F 11/302* (2013.01); *G06F 21/57* (2013.01)

(58) Field of Classification Search
CPC .... G06F 21/57; G06F 2221/033; G06F 21/54; G06F 21/55; G06F 21/56; G06F 21/566; G06F 8/30; G06F 21/128; G06F 11/36; G06F 11/302; G06F 8/20
See application file for complete search history.

(56) References Cited

U.S. PATENT DOCUMENTS

| | | | |
|---|---|---|---|
| 7,478,367 B2 | 1/2009 | Morgan et al. |
| 8,011,008 B2 | 8/2011 | Downen et al. |
| 8,402,547 B2 | 3/2013 | Wiegenstein et al. |
| 8,776,239 B2 | 7/2014 | Keukelaere et al. |
| 8,776,241 B2 | 7/2014 | Zaitsev |
| 9,069,967 B2 | 6/2015 | Wysopal et al. |
| 9,152,795 B2 | 10/2015 | Laverdière-Papineau |
| 9,268,945 B2 | 2/2016 | Williams et al. |

(Continued)

FOREIGN PATENT DOCUMENTS

CN 102750469 B 12/2015

OTHER PUBLICATIONS

List of IBM Patents or Patent Applications Treated as Related, Current date, 2018.

(Continued)

*Primary Examiner* — S. Sough
*Assistant Examiner* — Cheneca Smith

(57) ABSTRACT

Code monitoring and optimization may include code being monitored for potential security violations during an active code creation session. The procedure may include at least one of monitoring code for potential security violations during an active code creation session occurring on a client device, comparing the monitored code with an aggregate rule set stored in a repository, identifying at least one of a security violation or an error based on the comparing and identifying a correction to the at least one of the security violation or the error during the active code creation session.

20 Claims, 6 Drawing Sheets

(56) References Cited

U.S. PATENT DOCUMENTS

| | | |
|---|---|---|
| 2005/0283834 A1 | 12/2005 | Hall et al. |
| 2006/0070043 A1 | 3/2006 | Viega et al. |
| 2006/0156286 A1 | 7/2006 | Morgan et al. |
| 2006/0206868 A1 | 9/2006 | Bhat et al. |
| 2008/0134156 A1 | 6/2008 | Osminer et al. |
| 2008/0148284 A1 | 6/2008 | Epstein |
| 2010/0325359 A1 | 12/2010 | Goel et al. |
| 2011/0191855 A1 | 8/2011 | Keukelaere et al. |
| 2011/0209126 A1 | 8/2011 | Fehnker et al. |
| 2012/0017280 A1 | 1/2012 | Wiegenstein et al. |
| 2012/0222122 A1 | 8/2012 | Das |
| 2013/0086689 A1 | 4/2013 | Laverdière-Papineau |
| 2014/0165204 A1 | 6/2014 | Williams et al. |
| 2015/0121532 A1 | 4/2015 | Barel |
| 2015/0309813 A1 | 10/2015 | Patel |
| 2016/0335168 A1 | 11/2016 | Freiberg et al. |

OTHER PUBLICATIONS

William H. Frontiero et al., Automated Software Code Review, U.S. Appl. No. 15/093,013, filed Apr. 7, 2016.

Anonymous, "A Method and Tool for Code Review Enhancement", IPCOM000224221D, 1-8, 2014.

Baca et al. "Improving software security with static automated code analysis in an industry setting." Software: Practice and Experience 43.3 (2013): 259-279. Retrieved on Oct. 25, 2019, Retrieved from the Internet: U RL (Year: 2013).

Srivastava et al. "A security policy oracle: Detecting security holes using multiple API implementations." ACM SIGPLAN Notices. vol. 46. No. 6. ACM, 2011. Retrieved on Oct. 25, 2019, Retrieved from the Internet:U RL ( Year: 2011).

US 10,990,503 B2

AUTOMATED SOFTWARE CODE REVIEW

TECHNICAL FIELD

This application relates to software code review, and more specifically, to automatically identifying potential security threats and errors via a software development tool during code creation.

BACKGROUND

Software development is aided by software development tools such as integrated development environments (IDEs) which aid a user, such as a programmer, during development sessions and which permit access to source code and collaboration among others. During a development session, a user may be adding code which can create security concerns or which is likely to create problems later in the software development cycle.

In one example, suspect security patterns in APIs may be known and accessible during a current software development session. A compiler may identify certain threats after the code has been completed and submitted. In this case, the code is typically returned to the developer and may require a rework of the code to address any errors or a complete redesign based on the number or errors and/or security issues that were found.

SUMMARY

Code monitoring and optimization may include code being monitored for potential security violations during an active code creation session. In one embodiment, the procedure may include at least one of monitoring code for potential security violations during an active code creation session occurring on a client device, comparing the monitored code with an aggregate rule set stored in a repository, identifying at least one of a security violation or an error based on the comparing and identifying a correction to the at least one of the security violation or the error during the active code creation session.

Another example embodiment may include an apparatus including a processor configured to perform at least one of monitor code for potential security violations during an active code creation session occurring on a client device, compare the monitored code with an aggregate rule set stored in a repository, identify at least one of a security violation or an error based on the comparison, and identify a correction to the at least one of the security violation or the error during the active code creation session.

In another embodiment, a non-transitory computer readable storage medium may be configured to perform a procedure that includes at least one of monitoring code for potential security violations during an active code creation session occurring on a client device, comparing the monitored code with an aggregate rule set stored in a repository, identifying at least one of a security violation or an error based on the comparing and identifying a correction to the at least one of the security violation or the error during the active code creation session.

DETAILED DESCRIPTION

Figure 1:
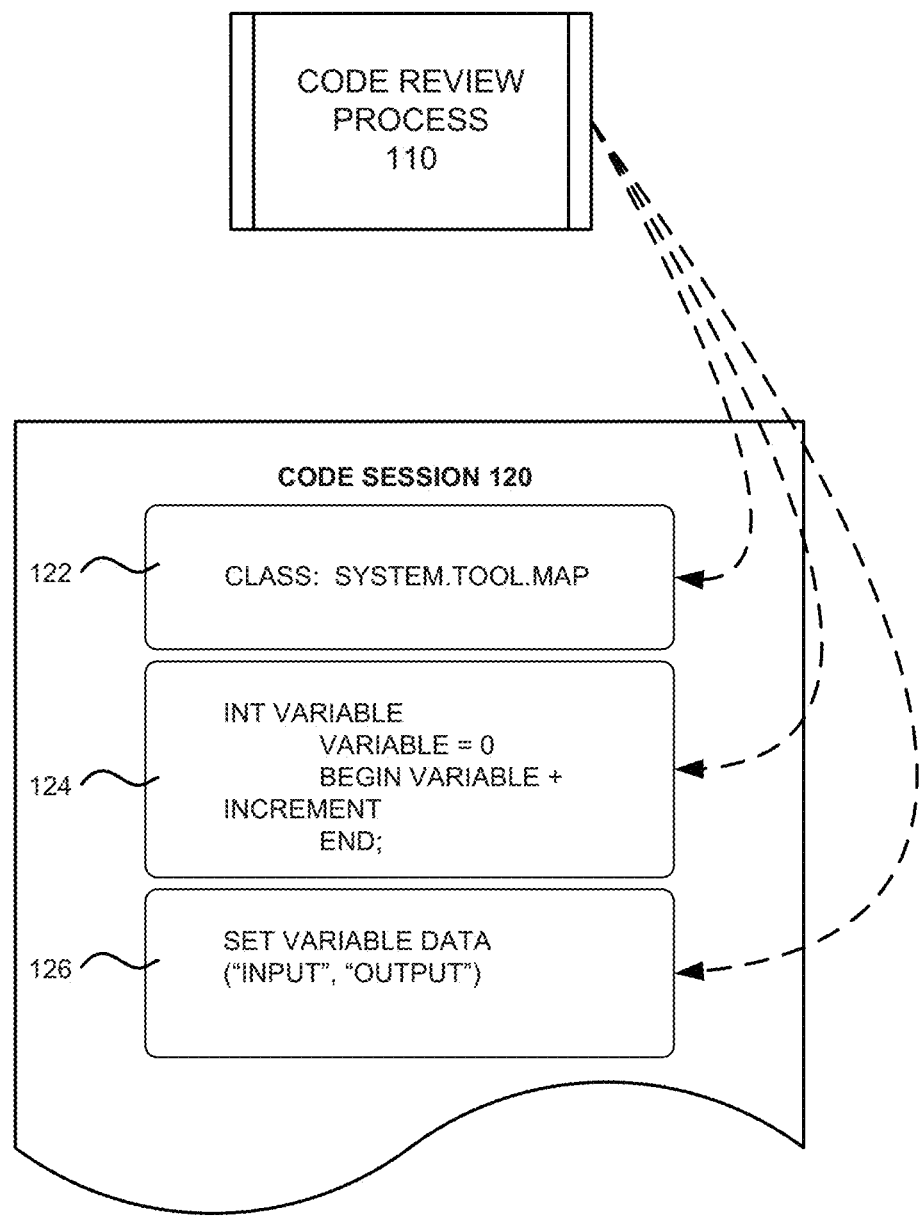
FIG. 1 illustrates a code review process monitoring code changes during an active code session according to an example embodiment.

It will be readily understood that the instant components, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments.

The instant features, structures, or characteristics of described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments, the application may be applied to many types of network data, such as, packet, frame, datagram, etc. The term "message" also includes packet, frame, datagram, and any equivalents thereof. Furthermore, while certain types of messages and signaling are depicted in exemplary embodiments they are not limited to a certain type of message, and the application is not limited to a certain type of signaling.

Example embodiments provide monitoring, auditing and/or updating of active code sessions performed on client devices and managed by a central server or central code library. Certain triggers may invoke security screening, suggestions, warnings (i.e., 'not secure', 'security threat', 'error', etc.). In operation, an active code session may include software code being accessed, updated, modified, added and/or deleted within a particular software coding environment tool, such as an integrated development environment (IDE). An IDE may include a software application that provides comprehensive facilities to computer programmers for software development. An IDE normally includes a source code editor, automation tools, a debugger and an intelligent code completion.

Some IDEs contain a compiler, interpreter, or both, such as NETBEANS and ECLIPSE, others do not, such as SHARPDEVELOP and LAZARUS. Some IDEs also have a class browser, an object browser, and a class hierarchy diagram, for use in object-oriented software development. During the active coding session, certain updates and changes may trigger a monitoring event to occur and pre-analyze or pre-compile the recently added code. The monitoring event may include auditing a most recent code update and comparing the update to known concerns stored in a library.

Certain code changes may invoke a warning, for example, any class and/or sub class which is stored in the library as being a suspect class based on previously logged errors or threats may invoke an alert when a user enters such a class or sub-class into the active session. In operation, a user/coder/analyst/developer/programmer may type code into the coding environment, such as an IDE interface. This may cause a monitoring event to occur each time a particular coding event occurs, such as a return (cursor moves to next line), a save, an auto-save, a compile, a pre-compile, etc. Any trigger could initiate a saving, storing, forwarding and auditing procedure that identifies the variables, functions, methods, classes, etc., which were added since the last audit performed on the code. As a result, a warning/suggestion trigger may occur based on the comparing of the code content to known alerts and errors stored in a library.

Example embodiments provide ways to identify insecure APIs and/or detectable patterns with code and perform potential corrections for those vulnerable implementations which have been identified. The real-time remediation of new software code can reduce the amount of time a developer requires to fix potential issues which leads to a quicker completion time. Also, automatic suggestions can be provided to correct potential solutions and alleviate security concerns. A remedy for insecure code could include automatically conforming to a known secure code pattern stored in a databank or code library or providing instructions which guide a developer through 'whitelists' or 'sanitizing' functions.

FIG. 1 illustrates a code review process monitoring code changes during an active code session according to an example embodiment. Referring to FIG. 1, a user coding interface or environment 100 may include a code session interface 120, such as a series of windows or applets which are available typing code and which may offer information, classes, etc., permitting the user to reference such coding tools to compose new code. In the code example of session 120, a code window includes various variables, loops, functions, definitions which are examples of code being entered into the coding environment interface. Each of the separate portions of the code 122, 124, and 126 may be deemed code instances which are considered new when received and which are logged, referenced by the code review process 110 as they are created. For example, as a first code segment 122 is created, the process 100 may capture the input and determine whether the class that was entered is a suspect class that is deemed insecure or designated as having problems. The code review process 110 may be a program or module linked to a software library that is operated by a remote server. The process may review code every time a predetermined number of characters are entered, a save operation is performed, a particular software parameter is used (e.g., class, loop, function, method), a particular variable is entered, etc. The process may operate by being integrated as a plug-in to the IDE.

Figure 2:
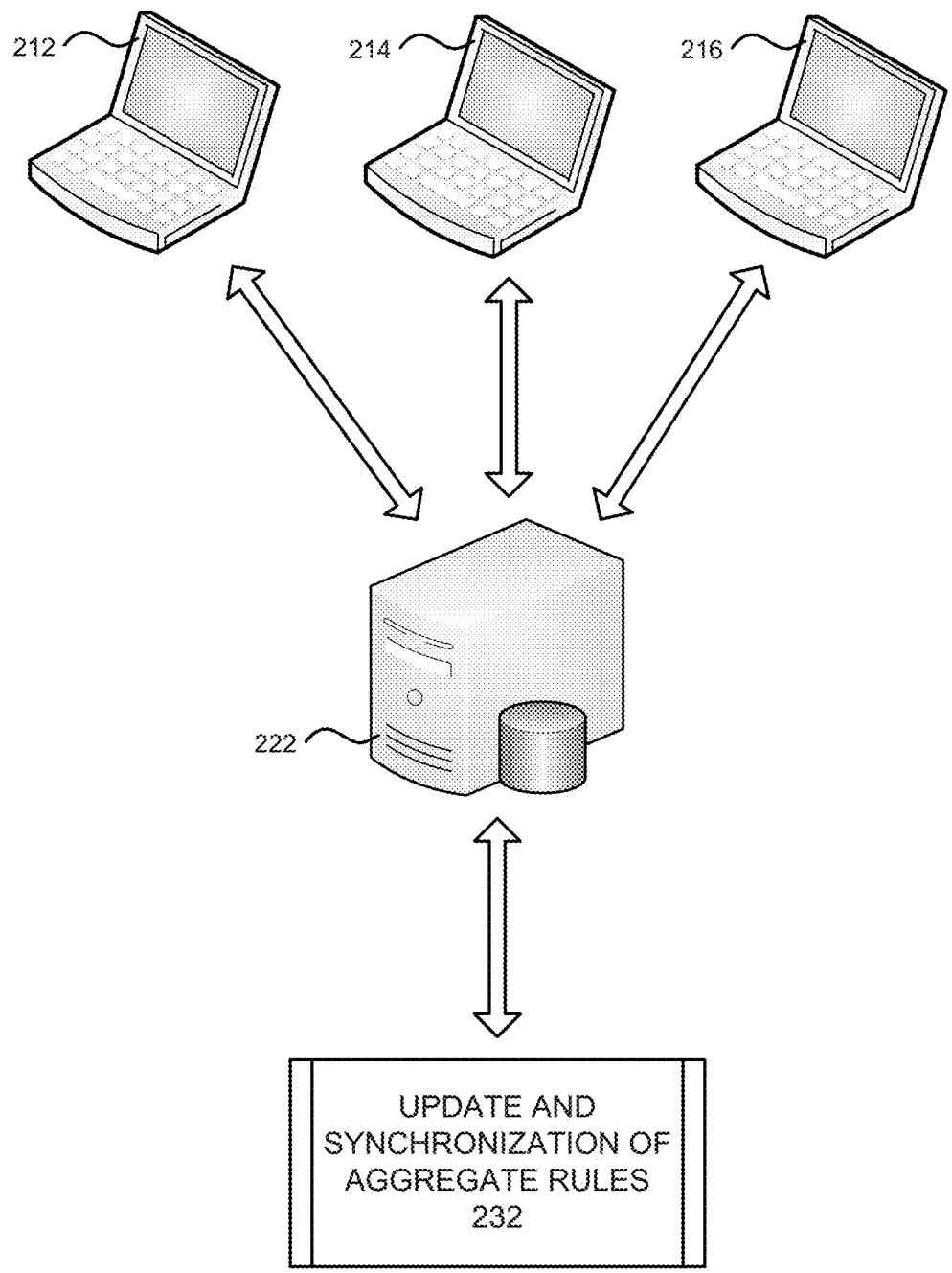
FIG. 2 illustrates a network system communication diagram of client devices being monitored by a centralized code management server according to an example embodiment.

FIG. 2 illustrates a network system communication diagram of client devices being monitored by a centralized code management server according to an example embodiment. Referring to FIG. 2, the network 200 includes various developer workstations 212, 214 and 216 which may be contributing to a common software development architecture or to individual software programs. A central repository 222 may be a server or other remote entity that is used to connect to the IDEs of the various workstations 212-216. Each of the workstations may be connected to the secure signature central repository in the server 222. In operation, the developer(s) would be writing code and when an insecure pattern, API, or other suspect usage is detected the user interface would be updated with a warning or error that the given code is not secure. The developer would then be presented with suggestions to remediate or replace insecure functions, or security considerations that should be made with the given code. The security scanner could be configured to adhere to corporate standards and would also permit for users to update insecure APIs when discovered. Any of the administrators or other users may update and synchronize the aggregate rules 232 as they are identified. The aggregate rules can then be updated and synchronized each time the updates are received. JAVADOC is a documentation generator for the JAVA language for generating API documentation in HTML format from JAVA source code. The library stored in the server 222 may have a JAVADOC repository which receives updates from aggregate rules received periodically from a cloud based service provider of secure API libraries and JAVADOC.

Figure 3:
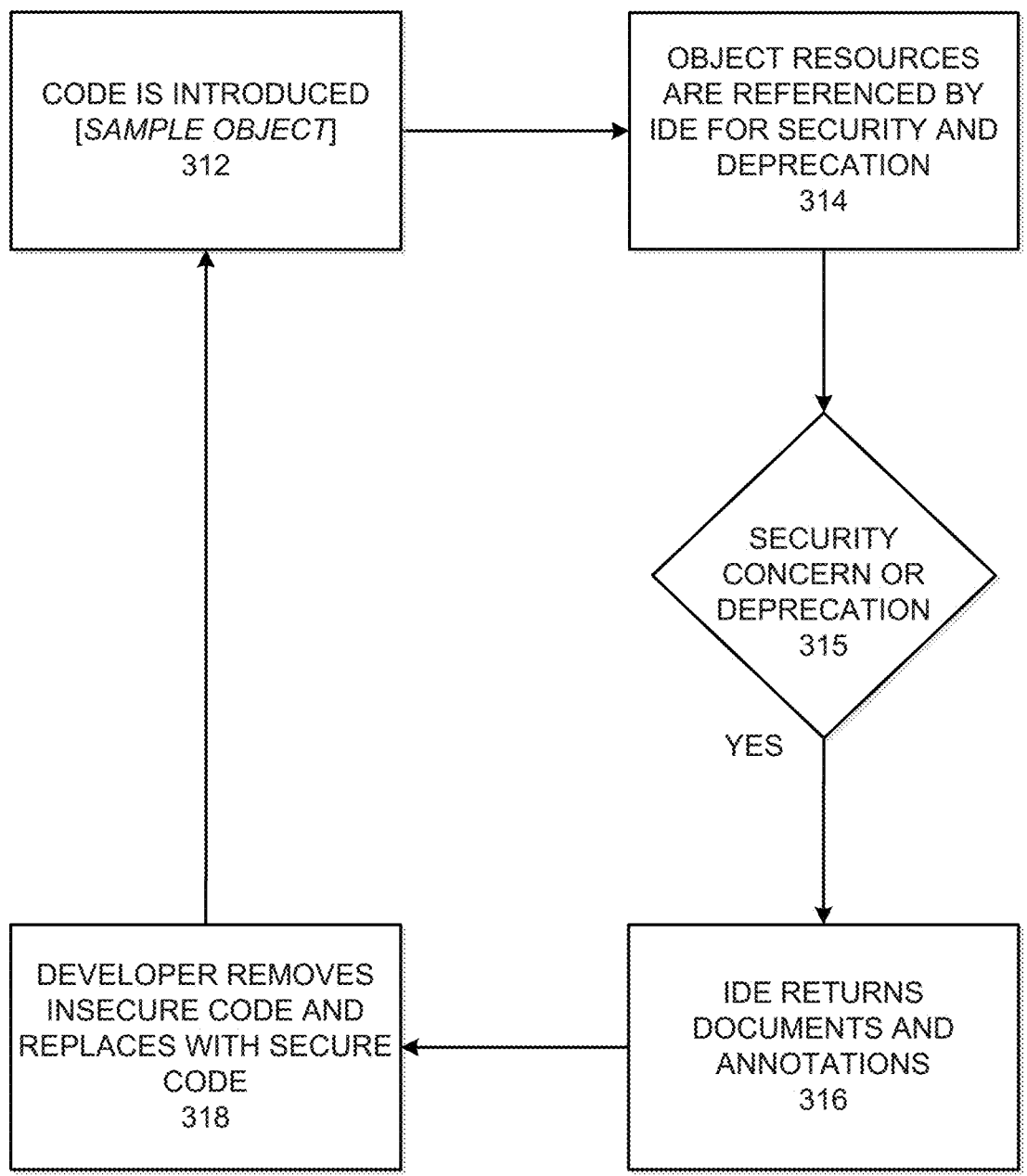
FIG. 3 illustrates a logic flow diagram of a code security monitoring procedure during an active code session according to an example embodiment.

FIG. 3 illustrates a logic flow diagram of a code security monitoring procedure during an active code session according to an example embodiment. Referring to FIG. 3, the flow diagram 300 includes a series of operations which correlate with the code audit and alert configuration of the present application. When a developer introduces new code 312 in an IDE interface, such as a sample object JAVAX.SQL.STATEMENT as an exemplary JAVA object, the JAVADOC and library for the object are referenced by the IDE for secure API documents or for deprecation purposes. The object can be referenced by JAVADOC or library for IDE for a secure API doc or deprecation 314. If an alert or other type of deprecation is necessary it can be identified by the IDE plug-in for access to such resources. The security concern or deprecation item can be determined to exist 315 and then the IDE can return the warnings, alerts, suggestions to the develop IDE interface for reference purposes 316. Also, the class or object may automatically be nullified or removed from further access pending an update which fulfills the requirements of the library or other resources. The developer may remove the insecure code and replace it with secure code 318 as necessary to overcome the alert.

In another example, when a developer types in a particular class or object, such as, for example JAVA.SQL.STATEMENT; the automated secure code may reference this object or class with known objects or classes which are not permitted due to heightened security concerns. The result may be a removal of the portion considered insecure, such as the "STATEMENT" portion may be removed since known security threats are associated with that particular portion of the object/class. As a result, the JAVADOC or remediation measure may include an assistant function in the IDE interface which present the developer with an explanation, options, and links to assistance menus and/or code samples which could be used to alleviate the problem. Also, the alternatives may be automatically populated into the code to replace the suspect code with remedial code which is accepted as secure code.

Examples of code security actions provided by the present code security application may include, for example, a specific class, sub-class, method, or code statement group identification procedure which identifies a known class, sub-class, method and/or known code statement group which has a designated security violation setting assigned to that particular code segment. A particular class, sub-class, method or code statement group may have a security vulnerability designation that alerts the programmer or user attempting to access/inject such a code segment that the security violation has occurred. The access/inject attempt to the known security violation method may be identified by a global standard or global knowledgebase. The local enterprise or project database may have a specific enforcement pattern that is stricter than a more commonly known global security standard.

In one example, a programmer accesses a code segment, such as a specific method or sub-class of a class that is known to relate to security concerns and errors during a compile session. The code pattern may be identified by either a global security application IDE plug-in which monitors the code for known security threats and/or an enterprise code management application IDE plug-in which also monitors the code for a security violation. Any identified code pattern can be flagged so the programmers are notified of the enterprise violation. The local enterprise programming code rules can identify a flagged pattern or a class which is deemed a security violation. In this same example, a new or permissible class or method may instead be invoked to replace the selected and identified code violation based on the replacement settings of the code monitoring application. The code segment may be identified by a current application monitoring procedure.

In another example of the code monitoring application procedure, certain "code statement groups" may be identified by a local or enterprise level aggregate rule set. Software programmers sometimes recreate or frequently 'clone' invalid code instead of using new code or an existing class, subclass, method, etc. The reuse of such invalid groups of code statements or 'code segment' could be identified by any rule setup by an enterprise rule database for certain actions to occur depending on the result that is expected.

One example of an invalid code statement group may be, for example,

```
byte[] msgLenBytes;
inputStream.readBytes(msgLenBytes);
int msgLen = convertToLength(msgLenBytes);
char[] msgBuffer = new char[msgLen]
// Continue processing message
//
```

This block of code represents a case where two systems are communicating in which the first bytes of a message being sent indicate a likely error due to a likely buffer error. The common code segment may be intercepted by the code monitoring application and comments may be shared to include: //"In this snippet, the code is blindly creating a buffer the size of the length indicated, but this length could be large either maliciously or not. The value should be checked before the buffer is allocated, but in this case it is not." As a result, a suggested code pattern may already be approved for use and shared by the application to include a correction to the code. This may include

```
byte[] msgLenBytes;
inputStream.readBytes(msgLenBytes);
int msgLen = convertToLength(msgLenBytes);
```

-continued

```
if (msgLen <= MAX_MSG_LEN) {
    char[] msgBuffer = new char[msgLen]
    // Continue processing message
}
else {
    // Handle invalid message length as appropriate
    // Often involves resetting communication channel
    }.
```

In this example, the code correction places the 'msgLen' variable as having an exception via the 'if' and 'else' statement and thus the likely fault is corrected and the known error (buffer overflow) will not occur and the suggestions to correct are self-explanatory to the programmer based on the comments. The 'if' clause insures the fault condition is avoided and the 'else' clause provides a mechanism and suggestion for handling the error. Appropriate error handling will vary based on the code surrounding this code statement group. Other options include executing an exception to the method call chain which would depend on the structure of the surrounding code.

Figure 4:
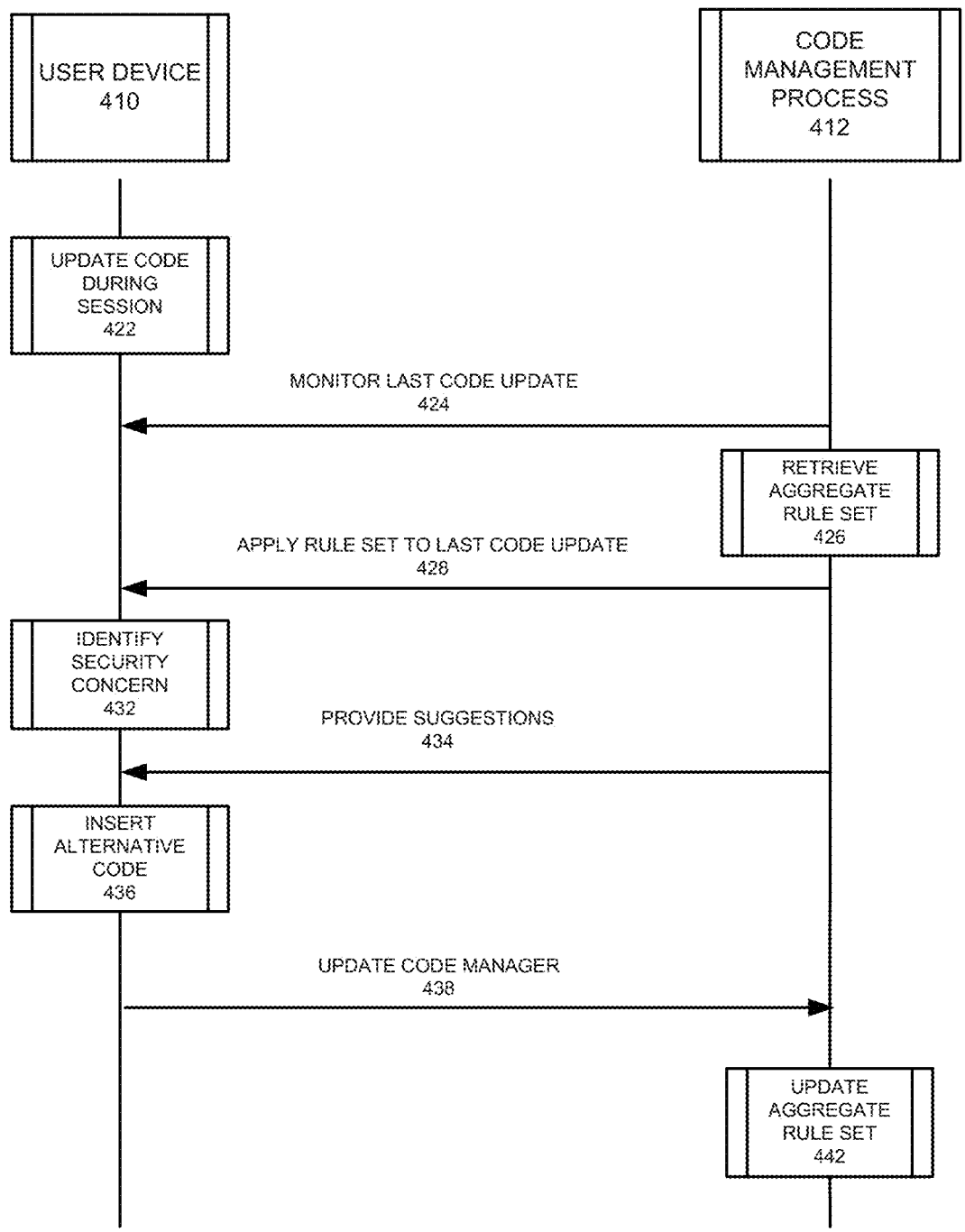
FIG. 4 illustrates a system signal and process diagram for performing a code monitoring procedure according to example embodiments.

FIG. 4 illustrates a system signal and process diagram for performing a code monitoring procedure according to example embodiments. Referring to FIG. 4, the system 400 includes a user device 410 which may represent a user workstation, a developer interface or other code creation tool. The code management process 412 may be a remote server or process that is constantly auditing the code submitted by the user device 410 and screening the code to identify updates. In operation, the code is updated 422 and a monitor operation is performed 424 to monitor the code. The monitoring may be performed only on the portion which has changed since the last update or all the code depending on the configuration. The aggregate rule set 426 may be retrieved and used as a basis to identify the suspect code creation action recently identified. The rule set is applied to the last code update 428 and any security concerns 432 can be identified and shared with the code environment interface. Suggestions 434 are provided to the user 410 so that alternative code options 436 can be included or certain features can be modified to accommodate the security concerns or errors. As additional changes are made the code manager 438 is updated to include the changes and any new rules which have been created since the previous update. The aggregate rule set 442 can also be updated for subsequent monitoring operations.

One example method of operation of the code management procedure may include monitoring code for potential security issues. The code may be part of an active coding session, the code may be identified as having suspect code portions which can then be identified and modified to accommodate the audit procedure. The changes to the code can be manual or automatic and may include adding or removing certain objects, variables and/or other code segments, and the result may be in compliance with the security measures imposed by the code review process.

Once a suspect segment of code is identified, certain modifications and suggestions can be provided to the developer during the code creation procedure by checking the code content against a remote aggregate rule set. The result may be identifying a potential security threat in the code and providing a suggestion to remediate the potential security issue. The remote aggregate rule set is maintained in a central repository in a cloud environment.

The cloud environment enables a dynamic repository which can be used for code review, updated and dynamically applied to any and all developers using IDEs which are linked to the repository. The rules repository will receive periodic updates from an aggregate rule set which may be a cloud based service offering. The cloud repository is an aggregate system of all libraries and JAVADOCs published and available for code examination purposes. When security vulnerabilities are found, the cloud repository is updated and pushed out to connected child replicas.

Figure 5:
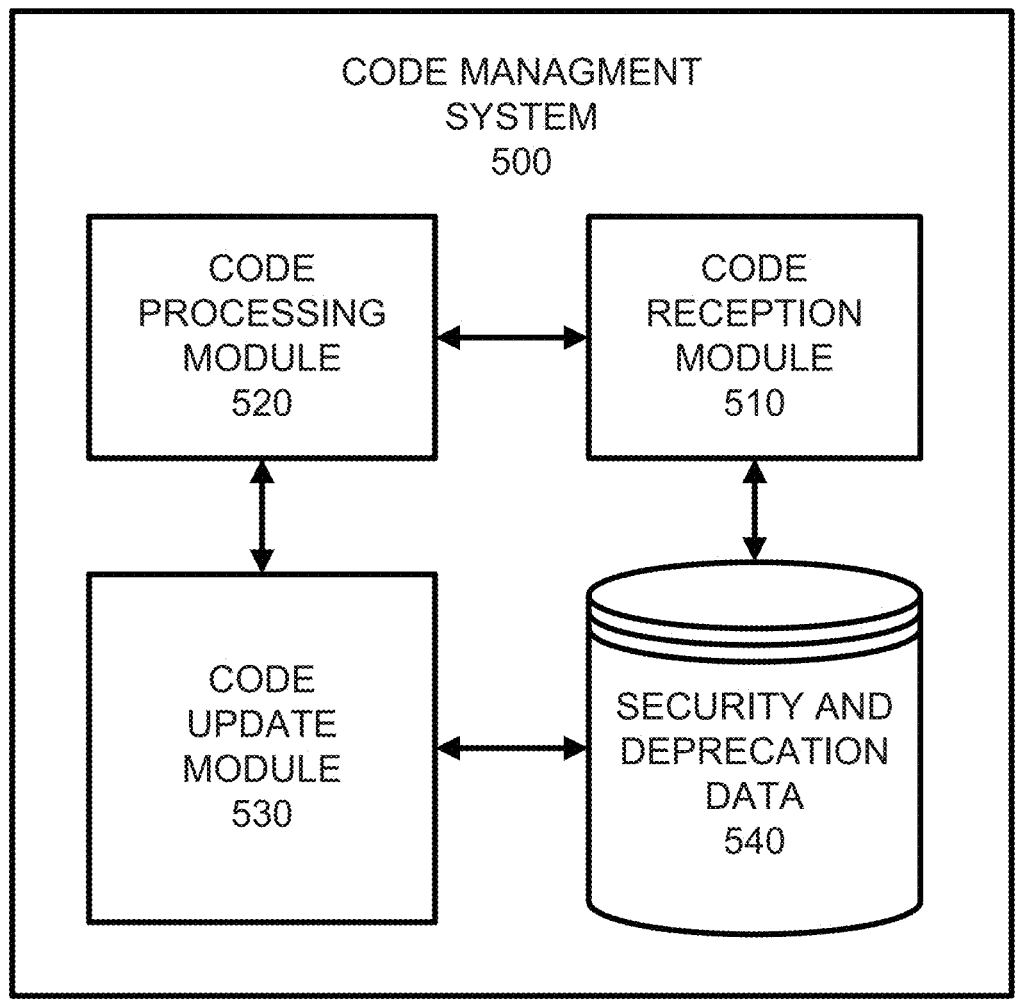
FIG. 5 illustrates a system device diagram configured to perform one or more example operations of the various example embodiments.

FIG. 5 illustrates a system device diagram configured to perform one or more example operations of the various example embodiments. Referring to FIG. 5, the code management system 500 may perform one or more code management operations during an active code session. For example, the code reception module 510 may periodically scan, copy and/or store code which has been recently added since a previous monitoring operation. The code that is received may be processed for security threats and potential errors via the processing module 520. The changes that need to be made to make the code compliant may be performed via the update module 530 based on the libraries and rule sets stored in the security data databank 540.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example network element 600, which may represent any of the above-described network components, etc.

Figure 6:
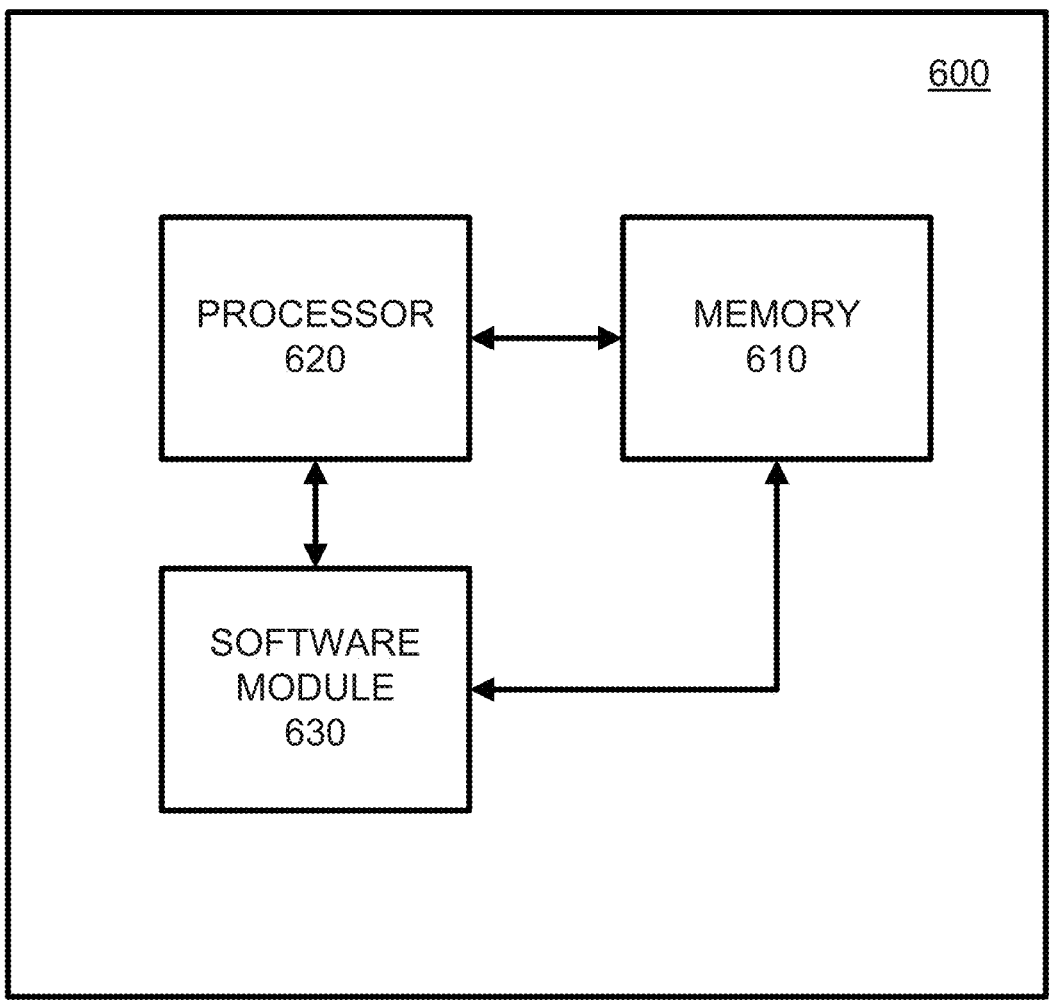
FIG. 6 illustrates an example network entity device configured to store instructions to perform one or more of the example embodiments.

As illustrated in FIG. 6, a memory 610 and a processor 620 may be discrete components of a network entity 600 that are used to execute an application or set of operations as described herein. The application may be coded in software in a computer language understood by the processor 620, and stored in a computer readable medium, such as, a memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    triggering a start point for a monitoring operation based on at least one of a time lapse, a predetermined number of keystrokes identified, a known variable being identified, a known object being identified, a known class being identified, a known error being identified, and a known security issue being identified;
    invoking the monitoring operation in response to determining that a software class has been added during a code creation session related to the monitoring operation; and
    dynamically identifying, by the monitoring operation, one or more classes of code that have been added since a last monitoring operation, pre-compiling the identified classes, and dynamically determining at least one class from the pre-compiled classes is a potential security threat based on compiled code included in the at least one class.

2. The method of claim 1, further comprising determining at least one of a security violation and an error associated with an API based on the software class.

3. The method of claim 2, wherein the determining the at least one of the security violation and the error further comprises comparing code to an aggregate rule set stored in an API library that is located in a cloud environment and which is dynamically updated.

4. The method of claim 3, further comprising updating the aggregate rule set by uploading at least one of:
    a most recently published rule set to the aggregate rule set; and
    at least one change to the aggregate rule set.

5. The method of claim 1, further comprising initiating the monitoring operation via an integrated development environment (IDE) during the code creation session via a client device.

6. The method of claim 1, further comprising referencing an API library based on the software class that has been added.

7. The method of claim 1, further comprising providing a correction to at least one of a security violation and an error during the active code creation session.

8. An apparatus, comprising:
    a processor configured to:
    trigger a start point for a monitoring operation based on at least one of a time lapse, a predetermined number of keystrokes identified, a known variable being identified, a known object being identified, a known class being identified, a known error being identified, and a known security issue being identified;
    invoke the monitoring operation in response to determining that a software class has been added during a code creation session related to the monitoring operation; and
    dynamically identify, by the monitoring operation, one or more classes of code that, have been added since a last monitoring operation, pre-compiling the identified classes, and dynamically determining at least one class from the pre-compiled classes is a potential security threat based on compiled code included in the at least one class.

9. The apparatus of claim 8, wherein the processor is further configured to determine at least one of a security violation and an error associated with an API based on the software class.

10. The apparatus of claim 9, wherein the processor determines the at least one of the security violation and the error further comprises code being compared by the processor to an aggregate rule set stored in an API library that is located in a cloud environment and which is dynamically updated.

11. The apparatus of claim 10, wherein the processor is further configured to update the aggregate rule set by an upload of at least one of:
    a most recently published rule set to the aggregate rule set; and
    at least one change to the aggregate rule set.

12. The apparatus of claim 8, wherein the processor is further configured to initiate the monitoring operation via an integrated development environment (IDE) during the code creation session via a client device.

13. The apparatus of claim 8, further comprising referencing the API library based on the software class that has been added.

14. The apparatus of claim 8, wherein the processor is further configured to provide a correction to at least one of a security violation and an error during the active code creation session.

15. A non-transitory computer readable storage medium configured to store instructions that when executed cause a processor to perform a method comprising:
    triggering a start point for a monitoring operation based on at least one of a time lapse, a predetermined number of keystrokes identified, a known variable being identified, a known object being identified, a known class being identified, a known error being identified, and a known security issue being identified;
    invoking the monitoring operation in response to determining that a software class has been added during a code creation session related to the monitoring operation; and
    dynamically identifying, by the monitoring operation, one or more classes of code that have been added since a last monitoring operation, pre-compiling the identified classes, and dynamically determining at least one class from the pre-compiled classes is a potential security threat based on compiled code included in the at least one class.

16. The non-transitory computer readable storage medium of claim 15, wherein the method further comprises determining at least one of a security violation and an error associated with an API based on the software class.

17. The non-transitory computer readable storage medium of claim 15, wherein the dynamically identifying comprises comparing code to an aggregate rule set stored in an API library that is located in a cloud environment and which is dynamically updated.

18. The non-transitory computer readable storage medium of claim 17, wherein the method further comprises updating the aggregate rule set by uploading at least one of:
   a most recently published rule set to the aggregate rule set; and
   at least one change to the aggregate rule set.

19. The non-transitory computer readable storage medium of claim 15, wherein the method further comprises initiating the monitoring operation via an integrated development environment (IDE) during the code creation session via a client device.

20. The non-transitory computer readable storage medium of claim 15, wherein the method further comprises providing a correction to at least one of a security violation and an error during the active code creation session.

* * * * *